United States Patent [19]

Flores et al.

[11] Patent Number: 4,888,249

[45] Date of Patent: Dec. 19, 1989

[54] METHOD FOR IMPROVING THE BOND STRENGTH OF SARAN POLYMERS TO POLYAMIDES

[75] Inventors: David P. Flores, Lake Jackson, Tex.; Philip E. Alei, Concord, Calif.

[73] Assignee: The Dow Chemical Company, Midland, Mich.

[21] Appl. No.: 329,904

[22] Filed: Mar. 28, 1989

Related U.S. Application Data

[63] Continuation-in-part of Ser. No. 140,846, Jan. 5, 1988, abandoned.

[51] Int. Cl.$^4$ .............................................. B32B 27/08
[52] U.S. Cl. ................................ 428/476.1; 428/476.9
[58] Field of Search .................. 428/421, 476.1, 476.9, 428/474.4; 525/97; 526/318.6

[56] References Cited

U.S. PATENT DOCUMENTS

| | | | |
|---|---|---|---|
| 4,599,392 | 7/1986 | McKenney et al. | 526/318.6 |
| 4,640,865 | 2/1987 | Lancaster et al. | 428/421 |
| 4,661,549 | 4/1987 | Walker | 525/97 X |
| 4,732,795 | 3/1988 | Ohya et al. | 428/476.1 X |
| 4,749,607 | 6/1988 | Ochiumi | 428/476.1 X |

OTHER PUBLICATIONS

English translation of Japanese Patent No. Sho 52-40290, 4-11-77, pp. 1-7.

*Primary Examiner*—Thomas J. Herbert

[57] ABSTRACT

A method for bonding homopolymers or copolymers of vinylidene chloride to polyamides which method comprises blending the polymer or copolymer with low density polyethylene, high density polyethylene, linear low density polyethylene, homopolymer or copolymer of propylene, or a copolymer of ethylene and acrylic acid, methacrylic acid and a small amount of copolymer of ethylene and a lower alkyl or hydroxyalkyl ester of acrylic or methacrylic acid and then contacting the blend of polymers with the polyamide under heat and pressure. Unexpected adhesion between the Saran blend and the polyamide was found.

8 Claims, No Drawings

METHOD FOR IMPROVING THE BOND STRENGTH OF SARAN POLYMERS TO POLYAMIDES

CROSS-REFERENCE TO RELATED APPLICATION

This is a continuation-in-part application of application Ser. No. 140,846 filed Jan. 5, 1988 now abandoned.

FIELD OF THE INVENTION

The present invention pertains to a method for improving the bond strength between Saran barrier polymers and polyamides.

BACKGROUND OF THE INVENTION

Composites or multi-layers of polymer films are employed in packaging various items such as, for example, yogurt, condiments, beverages, preservatives and the like. Saran polymers are employed in composites to provide the composite with oxygen and water barrier properties to prevent spoilage. Another layer(s) sometimes employed in such composites are polyamides which provide the composite with toughness, temperature resistance, abrasion resistance, and aroma barrier properties. Such composites can also contain, in addition to the polyamide, other $\alpha$-olefin polymers such as high density polyethylene or linear low density polyethylene and the like which provide the compoiste with a heat seal layer due to low temperature resistance and ease of melting. One problem which must be solved in the formation of such composites is the total absence of adhesion between the Saran polymers and the polyamides. It is also well-known that polyolefins such as linear low density polyethylene have no adhesion to polaymides either. It is therefore, desired to develop a method which would permit the adhesion of the Saran polymers for oxygen and water barrier properties to polyamides for the temperature resistance and aroma barrier, and to permit such a composite to be sealable by heating or subjecting the composite to radio frequency energy.

Currently, one method for forming such composites is to apply a coating of a Saran latex to the polyamide but the coating applied is minimal and no polyethylene is employed. Another method is to employ a tie or glue layer such as an ethylene/vinyl acetate polymer which is either co-extruded, laminated, or extrusion coated onto the polyamide. The Saran polymer is then applied to the side with the ethylene/vinyl acetate polymer by lamination, extrusion lamination or as a latex with subsequent solvent removal.

It would be desirable to have a method for adhering polyamides to Saran polymers without having to employ an adhesive layer.

SUMMARY OF THE INVENTION

The present invention pertains to amethod for adhering homopolymers or copolymers or vinylidene chloride to a polyamide which comprises contacting a polyamide with a blend comprising (A) from about 50 to about 90, percent by weight of a homopolymer or copolymer of vinylidene chloride which homopolymer or copolymer is essentially free of carboxyl, acid anhydride, hydroxyl and epoxy groups;

(B) from about 50 to about 10 percent by weight of a polymer selected from the group consisting of
  (1) low density polyethylene;
  (2) high density polyethylene;
  (3) linear low density polyethylene;
  (4) homopolymers or copolymers of propylene;
  (5) copolymer of ethylene and at least one other comonomer of acrylic acid or methacrylic acid or
  (6) any combination thereof; and (C) a compatibilizing amount of a copolymer of ethylene and at least one loewr alkyl or hydroxyalkyl ester of acrylic acid or methacrylic acid;

under sufficient heat and pressure to create bonding between the blend of components (A), (B) and (C) and the polyamide.

Another aspect of the present invention pertains to a polymer composite of two or more layers of at least two different polymer compositions, wherein (I) one such layer is a polyamide; and
(II) another such layer is a polymer composition comprising a blend of
  (A) from about 50 to about 90 percent by weight of a homopolymer or copolymer of vinylidene chloride which homopolymer or copolymer is essentially free of carboxyl, acid anhydride, hydroxyl and epoxy groups;
  (B) from about 50 to about 10 percent by weight of a polymer selected from the group consisting of
    (1) low density polyethylene (LDPE);
    (2) high density polyethylene (HDPE);
    (3) linear low density polyethylene (LLDPE);
    (4) polypropylene, homo or copolymers;
    (5) copolymer or ethylene and at least one comonomer of acrylic acid or methacrylic acid or
    (6) any combination thereof; and
  (C) a compatibilizing amount of a copolymer of ethylene and at least one lower alkyl or hydroxyalkyl ester of acrylic acid or methacrylic acid; and wherein within said composite, at least two such layers comprise one layer of polymer (I) directly bonded to one layer of polymer (II) without an adhesive layer therebetween.

The present invention provides a method for adhering polyamides to Saran polymers without having to employ a separate adhesive layer.

DETAILED DESCRIPTION OF THE INVENTION

The polyamide polymers or resins employed in the present invention include, those polymers made by condensation of diamines with dibasic acids, or by polymerization of lactams, or amino acids. Polyamines or polybasic acid may also be used. Particularly suitable polyamides which are useful in the present invention include, for example, nylons 4, 6, 7, 8, 9, 11, 66, 610, all combinatins thereof and the like.

The Saran polymers which are suitably employed herein are homopolymers of vinylidene chloride or copolymers of vinylidene chloride and suitably from about 5 to about 30, more suitably from about 10 to about 25, most suitably from about 15 to about 20 percent by weight of one or more coplymerizable ethylenically unsaturated monomer(s). Suitable such polymerizable ethylenically unsaturated monomers include, for example, vinyl chloride, methyl acrylate, methyl methacrylaet, ethyl acrylate, ethyl methacrylate, acrylonitrile, methacrylonitrile, all combinations thereof and the like. Vinyl chloride is particularly suitable. The Saran polymers generally have densities in the range from about 1.80 to about 1.50, suitably from about 1.75 to about 1.60 more suitably from about 1.75 to about 1.70 gms./cc. These Saran polymers usually have a melt index as determined by ASTM D-1238-E at a temperature of 177° C. in the range of from about 1.5 to about 4.0, suitably from about 2.0 to about 3.0, more suitably from about 2.5 to about 3.0, gms./10 min.

The amount of Saran polymers employed in the blend is suitably from about 50, to about 90, more suitably from about 65, to about 80, most suitably from about 70 to 75, percent by weight based upon the total weight of the polymer blend.

The high density polyethylene polymers (HDPE) which are suitably employed herein include those homopolymers or copolymers of ethylene produced by the Ziegler-Natta catalysts and having a density in the range of from about 0.950 to about 0.965, suitably from about 0.955 to about 0.962, more suitably from about 0.960 to about 0.962, gms./cc. These HDPE copolymers usually have a melt index as determined by ASTM D-1238, Condition E, in the range of from about 0.01 to about 200, suitably from about 0.08 to about 50, more suitably from about 0.1 to about 25, most suitably from about 0.08 to about 5, gms./10 min.

The low density polyethylene polymers (LDPE) produced by the ICI process which are suitably employed herein include those homopolymers of ethylene having a density in the range from about 0.915 to about 0.930, suitably from about 0.918 to about 0.925 more suitably from about 0.920 to about 0.922 gms/cc. These LDPE polymers usually have a melt index as determined by ASTM D-1238, Condition E in the range of from about 0.01 to about 200, suitably from about 0.08 to about 50, more suitably from about 0.1 to about 25, most suitably from about 0.8 to about 5, gms./10 min.

The linear low density polyethylene polymers (LLDPE) are produced by Ziegler-Natta or gas phase process and which are suitably employed herein include those copolymers of ethylene and minor amounts, generally from about 5% to about 20% by weight, of at least one α-olefin having from 3 to about 14 carbon atoms. The LLDPE usually has a density in the range of from about 0.880 to about 0.935, suitably from about 0.905 to about 0.930 more suitably from about 0.910 to about 0.920, gms./cc. These LLDPE polymers usually have a melt index as determined by ASTM D-1238, Condition E in the range from about 0.01 to about 200, suitably from about 0.08 to about 50, more suitably from about 0.10 to about 25 most suitably from about 0.8 to about 5, gms/10 min. Particularly suitable α-olefins which are copolymerized with the ethylene to form the LLDPE include, for example, propylene, 1-butene, 1-isobutene, 1-pentene, 1-isopentene, 1-hexene, 1-isohexene, 1-heptene, 1-isoheptene, 1-octene, 1-isooctene, 1-nonene, 1-isononene, 1-decene, 1-isodecene, 1-methyl-4-pentene, all combinations thereof and the like.

The copolymers of ethylene and at least one of acrylic acid of methacrylic acid also made by the high pressure free-radical process as described in U.S. Pat. No. 4,599,392 suitably contain from about 1 to about 25, more suitably from about 2 to about 12, most suitably from about 5 to about 10, wt. % comonomer. These ethylene/(meth)acrylic acid copolymers suitably have densities in the range from about .920 to about 0.980, more suitably from about 0.925 to about 0.965, most suitably from about 0.930 to about 0.965, gms./cc. They suitably have a melt index as determined by ASTM D-1238, Condition E in the range from about 0.01 to about 200, suitably from about 0.08 to about 50, more suitably from about 0.1 to about 25, most suitably from 0.8 to about 5, gms./10 min.

The amount of the low density polyethylene, high density polyethylene, linear low density polyethylene, polypropylene or copolymers of ethylene and at least one of acrylic acid or methacrylic acid or combination of such polymers employed in the blend is suitably from about 50, to about 10, more suitably from about 35, to about 15, most suitably from about 30 to 20, percent by weight based upon the total weight of the polymer blend.

Since blends of the ethylene polymers and the Saran polymers are not compatible, a compatibilizing resin must be employed. Suitable compatibilizing resins which can be employed herein include, for example, copolymers of ethylene and at least one lower alkyl or hydroxyalkyl ester of acrylic or methacrylic acid. These esters usually have from about 1 to about 8 more suitably from about 1 to about 6 most suitably from about 1 to about 4 carbon atoms in the ester group. Suitable such alkyl or hydroxyalkyl esters include, for example, ethyl, propyl, isopropyl, butyl, sec-butyl, isobutyl, pentyl, hexyl, heptyl, octyl, 2-ethylhexyl, nonyl, decyl, hydroxyethyl, hydroxypropyl, and the like. These esters are usually employed in an amount of from about 2 to about 25, more suitably from about 5 to about 20, most suitably from about 10 to about 15, percent by weight of the copolymer.

The compatibilizing copolymer is suitably employed in amounts of from about 2 to about 14, more suitably from about 3 to about 12, most suitably from about 5 to about 10, percent by weight based upon the total weight of the polymers employed in the blend.

The Saran polymer composition also contains one or more components such as, for example, antioxidants or plasticizers, such as for example, tetrasodium pyrophosphate, epoxidized linseed oil, epoxidized soybean oil, hindered phenolic compounds such as 3,5-ditertiarybutyl-4-hydroxy-hydrocinnamate (Irganox 1076), tetrakis(methylene(3,5-ditertbutyl-4-hydroxy-hydrocinnamate))methane (Irganox 1010), combinations thereof and the like. These components are employed in minor amounts, suitably from about 0.01 to about 3, more suitably from about 2 to about 2.5 percent by weight of the Saran polymer. The polyolefin, or ethylene (meth)acrylic acid copolymer, as well as the compatibilizer ethylene acrylate ester copolymer can also, if desired, contain small amounts of antioxidants such as Irganox 1076 or Irganox 1010.

The Saran polymer, and a polyolefin of the types LDPE, HDPE and LLDPE or polypropylene and a compatibilizing copolymer are blended together by any suitable means such as in an extruder having a 20/1 Length/Diameter ratio, operated under mild extrusion conditions and minimum residence times so as to avoid polymer dehydrohalogenation. Temperatures of less than about 350° F. with residence times of less than 2 minutes are preferred. The extruder system should be nickel plated so as to avoid degradation due to iron catalysis. Higher temperatures could be employed provided very short residence times are likewise employed.

It is preferred to blend the polymers in an extruder system which has been especially designed for streamline flow and no screenpack. The avoidance of "dead spots" or areas of stagnant flow are critical to produce a homogeneous, non-degraded, and carbon free blend.

The Saran-containing polymer composition and the polyamide can be bonded together by any suitable means, such as by coextrusion, heat and pressure, extrusion lamination, lamination and the like.

Any method is suitable so long as the two polymer compositions are contacted with sufficient heat and pressure to ensure bonding to the extent such polymers will maintain a bond between each other. Suitable temperatures at which bonding can be accomplished include, for example, the temperature at which the polymers will just begin to flow. Suitable temperatures include, for example, from about 150° C. to about 270° C., more suitably from about 160° C. to about 200° C., most suitably from about 170° C. to about 180° C.

However, under no circumstance should the polymers be allowed to be subjected to a temperature which will cause the polymers to degrade. This results in dehydrohalogenation and carbonization of the Saran copolymers with resulting black specs. The limiting factor is usually the time/temperaure exposure of the Saran polymers to avoid degradation.

The pressure to which the polymers should become exerted will depend upon the temperature at which the polymers are placed into contact one with the other; however, lower temperatures will necessitate the use of higher pressures while higher temperatures will permit the use of lower pressures. Not enough pressure will not cause the polymers to bond together properly, while too much pressure will cause the polymers to form thin layered composites with potentially weak bonds. In case of extrusion lamination, the molten polyamide and the crystallized film of the Saran-polyolefin blend would be compressed together in a nip roll to form the composite. The opposite case could also be used to form a compose, i.e., the molten Saran-polyolefin blend could be applied to the crystallized polyamide film through a nip-roll assembly. Lamination would be conducted with two solidified films, i.e, one Saran-polyolefin blend and one nylon coming together to a hot roll assembly (one or two heated rolls) and pressure applied to adhere the films and form the composite.

Suitable pressures which can be employed to bond the two polymer compositions together include pressures from about 5 psig to about 50 psig, more suitably from about 7 psig to about 20 psig, most suitably from about 8 psig to about 15 psig.

The following examples are illustrative of the invention, but are not to be construed as to limit the scope thereof.

In the following examples and comparative experiments, the adhesion is deterined by the following defined mold adhesion test.

MOLDING SPECIMENS

A 9×6" (228.6 mm×152.4) compression molder having two platens heated to 350° F. (176.7° C.) and two platens ambient water cooled is used to mold the samples. An appropriate amount of the material to be tested is placed in a 25 mil (0.635 mm) thick steel mold (having inner dimensions of 6"×6" (152.4 mm×152.4 mm) between two sheets of Mylar TM film, which in turn, is between two support plates. The support plates are 10 to 25 mils (0.245×0.635 mm) thick and have no surface flaws which can be molded into the specimen. The support plates containing the resin and mold are placed between the 350° F. platens of the compression molder and the platens are closed and allowed to heat with no pressure for one minute. The support plates containing the mold and polymer are then placed in the water cooled section, and the platens raised until the platen on the compression molder is just pushed off its supports (i.e., about 3 psi (20.68 kPa) pressure on the sample). This puts a small amount of pressure on the hot polymer in the mold, and allows for proper cooling within one minute. After the one-minute cooling cycle, the platens are lowered, and the mold is removed from between the sheets of Mylar film. The sample is then cut from the mold using a razor blade against a clean, hard surface.

ADHERING TESTING SPECIMENS TO SUBSTRATE

The molded specimen above is placed on a sheet of Mylar TM film. Around the specimen is placed a 23 mil (0.584 mm) thick "shim" having inner diameter measurements of 7"×10" (177.8 mm×254 mm). On top of this is placed a Mylar TM tab measuring 3"×9" (76.2 mm×228.6 mm). The tab is centered on the plaque. On top of this is placed a sheet of the substrate to be adhered. Finally, a piece of Mylar TM film large enough to cover this is placed on top along with a steel support plate. The Mylar TM film is large enough to prevent any undesirable adhesion of the specimen to the support plates.

This layered system is then placed between the 350° F. platens of the compression molder and pressed immediately (with no melting time) to 10,000 psi (68.948 kPa) for two minutes. After this time period, the hot support plates are removed from the 350° F. platens and placed between the cool platens. The ram is then raised until the cool platens are just raised off of their supports. This represents a very low pressure for cooling. Two minutes are allowed for cooling, and the entire structure containing the specimen is removed from the cool platens. At this point, the Mylar TM film is removed from the specimen/substrate to be tested.

ADHESION TESTING

The above described laminate is then cut into two pieces across the Mylar tab and then into one-inch (25.4 mm) strips. This provides enough test specimens such that five tests are performed at a pull rate of two inches per minute using a "free hanging" peel. No backing plate is used in this procedure. The substrates are peeled carefully by hand initially, to begin the separation of the two materials so that no tearing occurs. Samples are peeled for a distance of 2 to 3 inches (50.8 to 76.2 mm) on an Instron machine at a pull rate of 2 inches per minute (50.8 mm/min.), and the average stress, in pounds per inch of width, is measured from the chart paper. The average of a number of peels is taken as the adhesion, in pounds per inch of width, and each measurement along with the average is recorded.

Melt Index is determined by ASTM D1238-E at 190° C. using a 2.16 kg weight through a 0.0825 in. (2.087 mm) orifice. For Saran or Saran blends, the melt index is determined at 177° C. to prevent degradaion.

Melt Flow Index is determined by ASTM D1238 at 230° C. using a 2.16 kg weight through a 0.0825 in. (2.087 mm) orifice.

EXAMPLE 1

A resin blend is prepared from the following polymers in the amounts indicated.

67 wt. % Saran copolymer containing 80 wt. % vinylidene chloride and 20 wt. % vinyl chloride. The polymer has a melt index of 2.97 g/10 min (@177° C., 2.16 kg weight, 0.0825 in. (2.09 mm) orifice) and a density of 1.7433 g/cc;

24 wt. % low density polyethylene (LDPE) prepared by the conventional high pressure free-radical process in an auoclave reactor. The polymer has a melt index of 1.34 g/10 min (@190° C., 2.16 kg weight, 0.0825 in. (2.09 mm) orifice) and a density of 0.922 g/cc; and 9 wt. % copolymer of ethylene (80 wt. %) and methyl acrylate (20 wt. % (EMA). The polymer has a melt index of 2.4 g/10 min (ASTM 1238 Cond. E).

The polymers are blended by means of a 2 inch (50.8 mm) NRM nickel plated extruder with a L/D ratio of 20/1 streamlined so as to avoid hagups and black specs. The polymers are blended with 98 wt. percent, based on the weight of polymers, 1.9 wt. percent as a staabilizer and with 0.066 wt. percent, based on the weight of polymers, as an antioxidant.

The resulting blend has a melt index of 2.39 g/10 min (@177° C., 2.16 kg weight, 0.0825 in. (2.09 mm) orifice) and a density of 1.4029 g/cc.

The resulting blend is tested for its adhesion to nylon 6. Since this blend crystallizes slowly, the specimens are placed in a forced-draft oven at 60° C. for 48 hours prior to testing. After this annealing step, the specimens are prepared for testing as outlined in the test procedure. The results are given in the Table.

EXAMPLE 2

The procedure of example 1 is repeated except that the following polymer blend is employed.

67 wt. % Saran copolymer containing 80 wt. % vinylidene chloride and 20 wt. % vinyl chloride. The polymer has a melt index of 2.97 g/10 min (@177° C., 2.16 kg weight, 0.0825 in. (2.09 mm) orifice) and a density of 1.7433 g/cc;

27 wt. % ethylene-propylene copolymer (EP). This polymer has a melt flow index of 4 (ATM D 1238 cond. L) and a density of 0.903; and 6 wt. % ethylene-ethyl acrylate copolymer (EEA) containing 85 wt. % ethylene and 15 wt. % ethyl acrylate. The polymer has a melt index of 6 g/10 min (ASTM 1238 Cond. E).

The resulting blend has a melt flow index of 2.54 g/10 min (@177° C., 2.16 kg weight, 0.0825 in. (2.09 mm) orifice) and a density of 1.4246 g/cc.

The resulting blend is tested for its adhesion to nylon 6 as described in Example 1. The results are given in the Table.

EXAMPLE 3

The procedure of example 1 is repeated except that the following polymer blend is employed.

68 wt. % Saran copolymer containing 80 wt. % vinylidene chloride and 20 wt. % vinyl chloride. The polymer has a melt flow index of 2.97 g/10 min (@177° C., 2.16 kg weight, 0.0825 in. (2.09 mm) orifice) and a density of 1.7433 g/cc;

23 wt. % ethylene-acrylic acid copolymer (EAA) containing 91 wt. % ethylene and 9 wt. % acrylic acid.. This polymer has a melt index of 5 (ASTM D 1238 cond. E) and a density of 0.935; and 9 wt. % ethtylene-ethyl acrylate copolymer (EAA) containing 85 wt. % ethylene and 15 wt. % ethyl acrylate. The polymer has a melt index of 6 g/10 min (ASTM 1238 Cond. E).

The resulting blend has a melt flow index of 2.58 g/10 min (@177° C., 2.16 kg weight, 0.0825 in. (2.09 mm) orifice) and a density of 1.380 g/cc.

The resulting blend is tested for its adhesion to nylon 6 as described in Example 1. The results are given in the Table.

EXAMPLE 4

The procedure of example 1 is repeated except that the following polymer blend is employed.

68 wt. % Saran copolymer containing 80 wt. % vinylidene chloride and 20 wt. % vinyl chloride. The polymer has a melt index of 2.97 g/10 min (@177° C., 2.16 kg weight, 0.0825 in. (2.09 mm) orifice) and a density of 1.7433 g/cc;

23 wt. % ethylene-acrylic acid copolymer (EAA) containing 90.5 wt. % ethylene and 9.5 wt. % acrylic acid.. This polymer has a melt index of 1.5 (ASTM D 1238 cond. E) and a density of 0.936; and 9 wt. % ethylene-ethyl acrylate copolymer (EEA) containing 85 wt. % ethylene and 15 wt. % ethyl acrylate. The polymer has a melt index of 6 g/10 min (ASTM 1238 Cond. E).

The resulting blend has a melt flow index of 2.46 g/10 min (@177° C., 2.16 kg weight, 0.0825 in. (2.09 mm) orifice) and a density of 1.3804 g/cc.

The resulting blend is tested for its adhesion to nylon 6 as described in Example 1. The results are given in the Table.

EXAMPLE 5

The procedure of example 1 is repeated except that the following polymer blend is employed.

68 wt. % Saran copolymer containing 80 wt. % vinylidene chloride and 20 wt. % vinyl chloride. The polymer has a melt flow index of 2.97 g/10 min (@177° C., 2.16 kg weight, 0.0825 in. (2.09 mm) orifice) and a density of 1.7433 g/cc;

23 wt. % low density polyethylene (LDPE) prepared by the conventional high pressure free-radical process in an autoclave reactor. The polymer has a melt index of 4.2 g/10 min (@190° C., 2.16 kg weight, 0.0825 in. (2.09 mm) orifice) and a density of 0.923 g/cc; and 9 wt. % ethylene-ethyl acrylate copolymer (EEA) containing 85 wt. % ethylene and 15 wt. % ethyl acrylate. The polymer has a melt index of 6 g/10 min (ASTM 1238 Cond. E).

The resulting blend has a melt flow index of 4.66 g/10 min (@177° C., 2.16 kg weight, 0.0825 in. (2.09 mm) orifice) and a density of 1.4029 g/cc.

The resulting blend is tested for its adhesion to nylon 6 as described in Example 1. The results are given in the Table.

COMPARATIVE EXPERIMENT A

The adhesion of the Saran copolymer containing 80 wt. % vinylidene chloride and 20 wt. % vinyl chloride to nylon 6 is determined by the procedure described in Example 1. The copolymer has a melt flow index of 2.97 g/10 min (@177° C., 2.16 kg weight, 0.0825 in. (2.09 mm) orifice) and a density of 1.7433 g/cc. The results are given in the Table.

COMPARATIVE EXPERIMENT B

The adhesion of the low density polyethylene homopolymer (LDPE to nylon 6 is determined by the procedure described in Example 1. The homopolymer has a melt index of 4.2 g/10 min (@177° C., 2.16 kg weight, 0.0825 in. (2.09 mm) orifice) and a density of 0.923 g/cc. The results are given in the Table.

COMPARATIVE EXPERIMENT C

The procedure of example 1 is repeated except that the following polymer blend is employed.

75 wt. % Saran copolymer containing 80 wt. % vinylidene chloride and 20 wt. % vinyl chloride. The polymer has a melt flow index of 2.97 g/10 min (@177° C., 2.16 kg weight, 0.0825 in. (2.09 mm) orifice) and a density of 1.7433 g/cc; and 25 wt. % ethylene-acrylic acid copolymer (EAA) containing 90.5 wt. % ethylene and 9.5 wt. % acrylic acid.. This polymer has a melt index of 1.5 (ASTM D 1238 cond. E) and a density of 0.936.

The resulting blend has a melt flow index of 2.34 g/10 min (@177° C., 2.16 kg weight, 0.0825 in. (2.09 mm) orifice) and a density of 1.370 g/cc.

The resulting blend is tested for its adhesion to nylon 6 as described in Example 1. The results are given in the Table.

TABLE

| Example No. or Comp. Expt. Letter | Saran Polymer Comp. | Polyamide Type | Adhesion lbs/in | kg/cm |
|---|---|---|---|---|
| 1 | 67% SARAN 24% LDPE 9% EMA | Nylon 6 | 11 | 1.96 |
| 2 | 67% SARAN 27% EP 6% EEA | Nylon 6 | 9.9 | 1.76 |
| 3 | 68% SARAN 23% EAA 9% EEA | Nylon 6 | 5.6 | 0.99 |
| 4 | 68% SARAN 23% EAA 9% EEA | Nylon 6 | 4.7 | 0.83 |
| 5 | 68% SARAN 23% LDPE 9% EEA | Nylon 6 | 3.6 | 0.64 |
| A* | 100% SARAN | Nylon 6 | 0.7 | 0.12 |
| B* | 100% LDPE | Nylon 6 | 0.03 | 0 |
| C* | 75% SARAN 25% EAA | Nylon 6 | 2.7 | 0.48 |

*Not an example of the present invention.

What is claimed is:

1. A polymer composite of two or more layers of at least two different polymer compositions, at least one of such layers being
   (I) a polyamide and another such layer being
   (II) a polymer composition comprising
   (A) from about 50 to about 90 percent by weight of a homopolymer or copolymer of vinylidene chloride which homopolymer or copolymer is essentially free of carboxyl, acid anhydride, hydroxyl and epoxy groups;
   (B) from about 50 to about 10 percent by weight of a polymer selected from the group consisting of
      (1) low density polyethylene (LDPE);
      (2) high density polyethylene (HDPE);
      (3) linear low density polyethylene (LLDPE);
      (4) polypropylene homo or copolymers;
      (5) copolymer of ethylene and at least one comonomer of acrylic acid or methacrylic acid or
      (6) any combination thereof; and
   (C) a compatibilizing amount of a copolymer of ethylene and at least one lower alkyl or hydroxyalkyl ester of acrylic acid or methacrylic acid; and
   wherein within said composite, at least two such layers comprise one layer of polymer (I) directly bonded to one layer of polymer (II) without an adhesive layer therebetween.

2. A polymer composite of claim 1 wherein component (A) is a copolymer of vinyl chloride and vinylidene chloride; component (B) is (a) a LDPE polymer, (b) a copolymer of ethylene and propylene, (c) a copolymer of ethylene and acrylic acid, (d) a LLDPE polymer, (e) an HDPE polymer, or (f) any combination thereof; component (C) is (a) a copolymer of ethylene and methyl acrylate, (b) a copolymer of ethylene and ethylacrylate or a combination thereof; and the polyamide is nylon 6.

3. A polymer composite of claim 1 wherein component (A) is present in amount of from about 50 to about 90 percent by weight and component (B) is present in an amount of from about 50 to about 10 percent by weight; and component (C) is present in an amount of from about 2 to about 14 percent by weight, all percentages by weight being based on the total weight of the blend.

4. A polymer composite of claim 3 wherein component (A) is a copolymer of vinyl chloride and vinylidene chloride; component (B) is (a) a LDPE polymer, (b) a copolymer of ethylene and propylene, (c) a copolymer of ethylene and acrylic acid, (d) a LLDPE polyer, (e) an HDPE polymer, or (f) any combination thereof; component (C) is (a) a copolymer of ethylene and methyl acrylate, (b) a copolymer of ethylene and ethylacrylate or a combination thereof; and the polyamide is nylon 6.

5. A polymer composite of claim 3 wherein (a) component (A) is present in an amount of from about 65 to about 80 percent by weight; (b) component (B) is present in an amount of from about 35 to about 15 percent by weight; and (c) component (C) is present in an amount of from about 3 to about 12 percent by weight, all percentages by weight being based on the total weight of the blend.

6. A polymer composite of claim 5 wherein component (A) is a copolymer of vinyl chloride and vinylidene chloride; component (B) is (a) a LDPE polymer, (b) a copolymer of ethylene and propylene, (c) a copolymer of ethylene and acrylic acid, (d) a LLDPE polymer (e) an HDPE polymer, or (f) any combination thereof; component (C) is (a) a copolymer of ethylene and methyl acrylate, (b) a copolymer of ethylene ethylacrylate or a combination thereof; and the polyamide is nylon 6.

7. A polymer composite of claim 5 wherein (a) component (A) is present in an amount of from about 70 to about 75 percent by weight; (b) component (B) is present in an amount of from about 30 to about 20 percent by weight; and (c) component (C) is present in an amount of from about 5 to about 10 percent by weight, all percentages by weight being based on the total weight of the blend.

8. A polymer composite of claim 7 wherein component (A) is a copolymer of vinyl chloride and vinylidene chloride; component (B) is (a) a LDPE polymer, (b) a copolymer of ethylene and propylene, (c) a copolymer of ethylene and acrylic acid, (d) a LLDPE polymer, (e) an HDPE polymer, or (f) any combination thereof; component (C) is (a) a copolymer of ethylene and methyl acrylate, (b) a copolymer of ethylene and ethylacrylate or a combination thereof; and the polyamide is nylon 6.

* * * * *